June 3, 1952    E. C. MERRY    2,599,469
DIFFERENTIAL WHEEL UNIT FOR TRAILERS OR THE LIKE
Filed Nov. 22, 1948    4 Sheets-Sheet 1
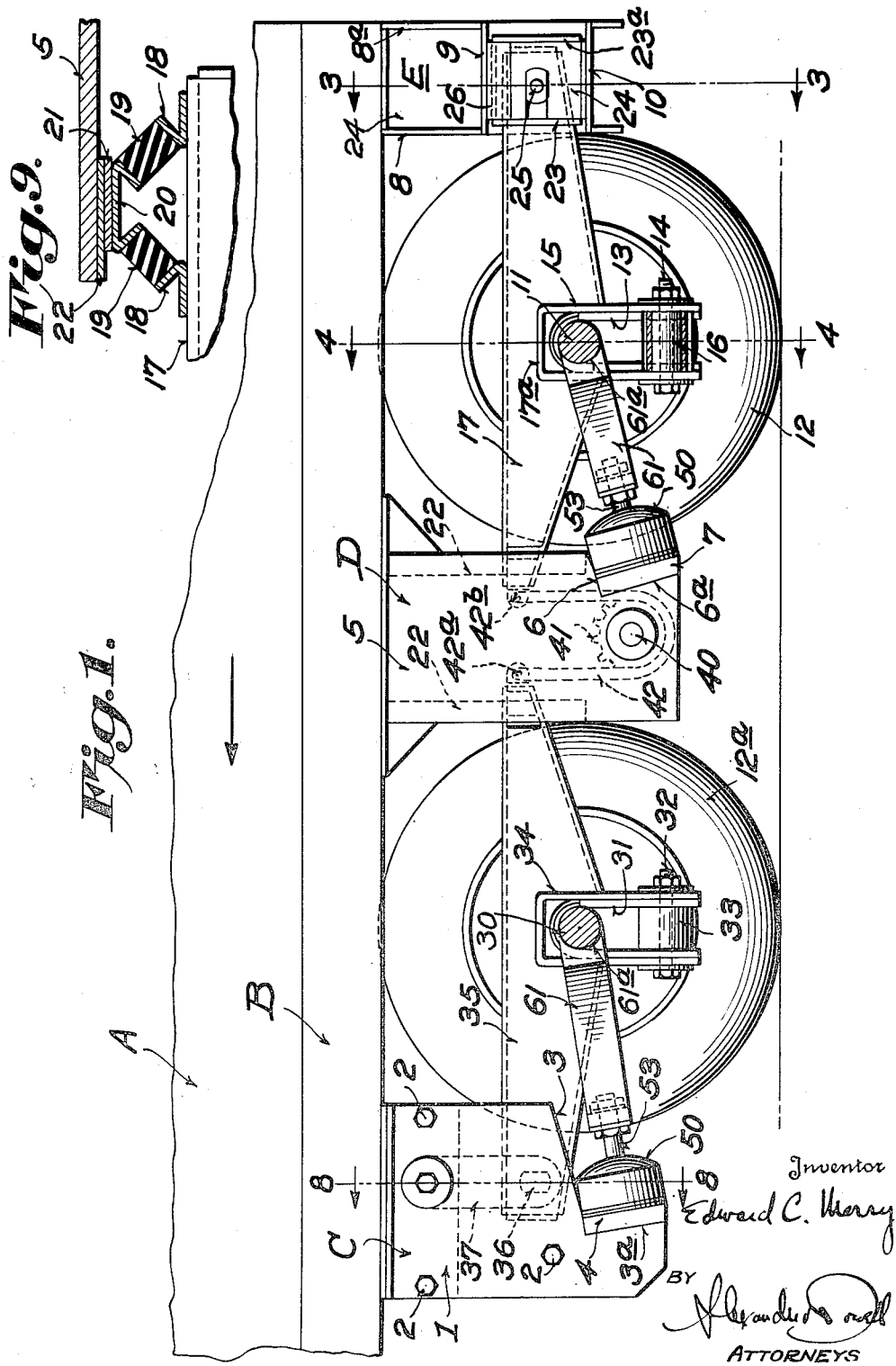

June 3, 1952        E. C. MERRY        2,599,469
DIFFERENTIAL WHEEL UNIT FOR TRAILERS OR THE LIKE
Filed Nov. 22, 1948        4 Sheets-Sheet 2
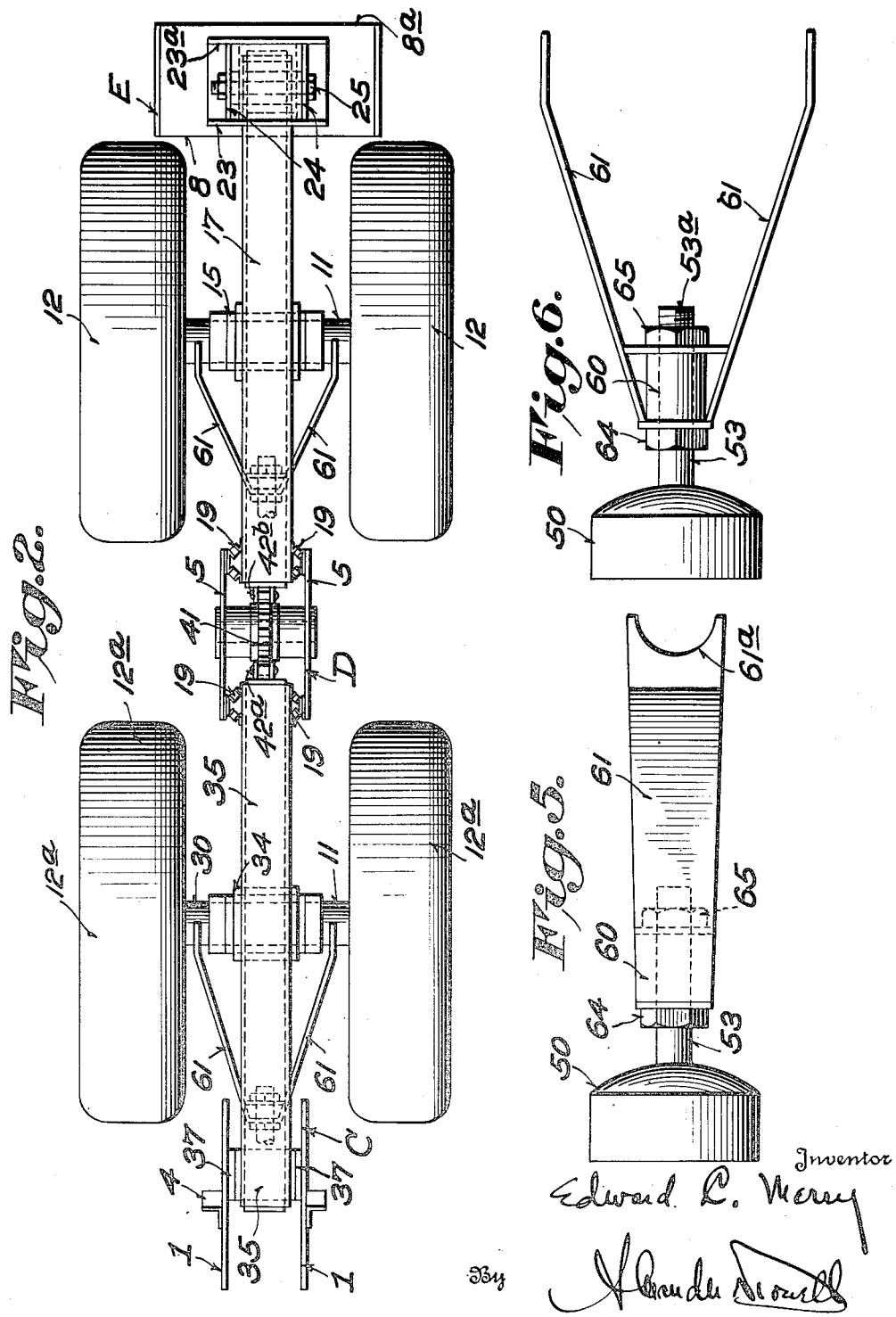
ATTORNEYS

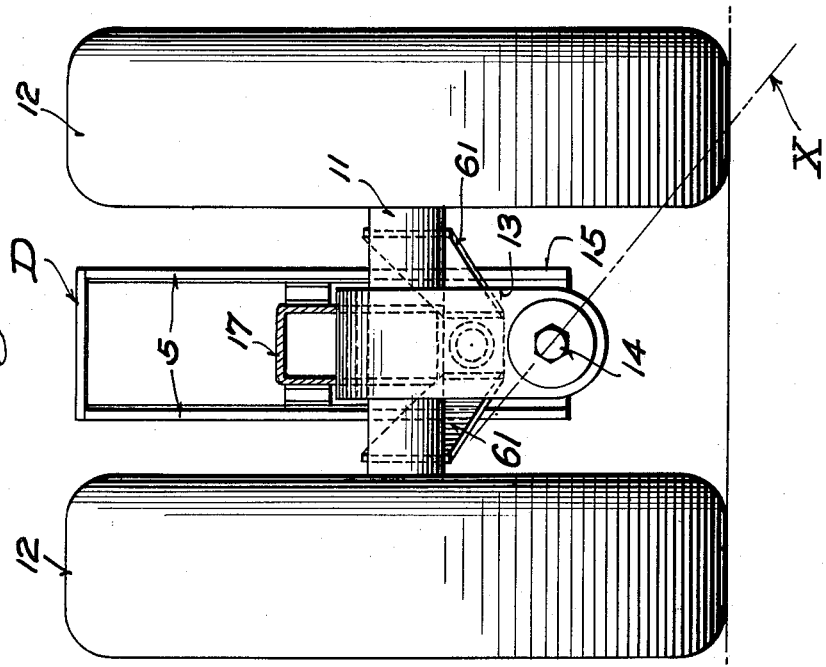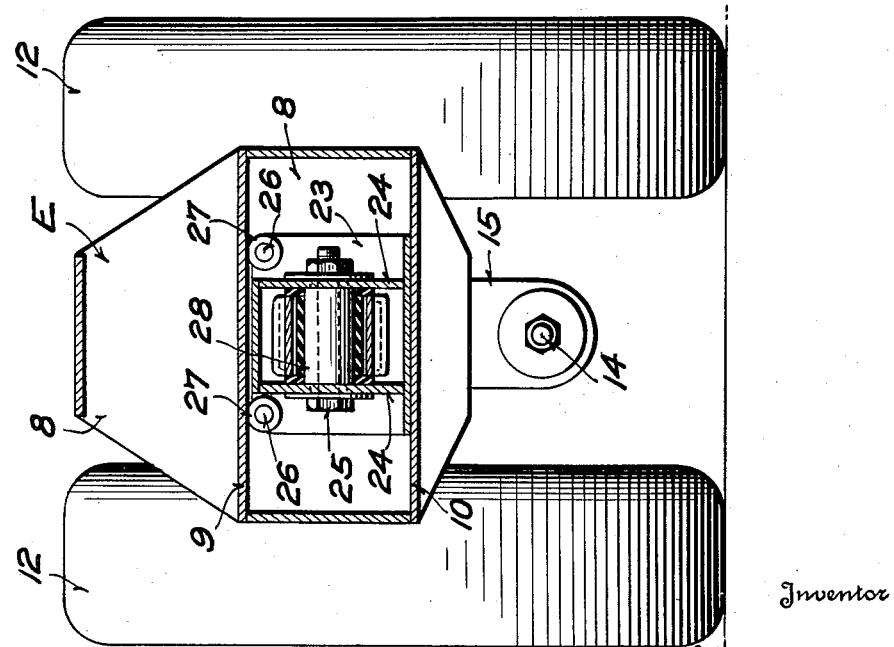

June 3, 1952   E. C. MERRY   2,599,469
DIFFERENTIAL WHEEL UNIT FOR TRAILERS OR THE LIKE
Filed Nov. 22, 1948   4 Sheets-Sheet 4
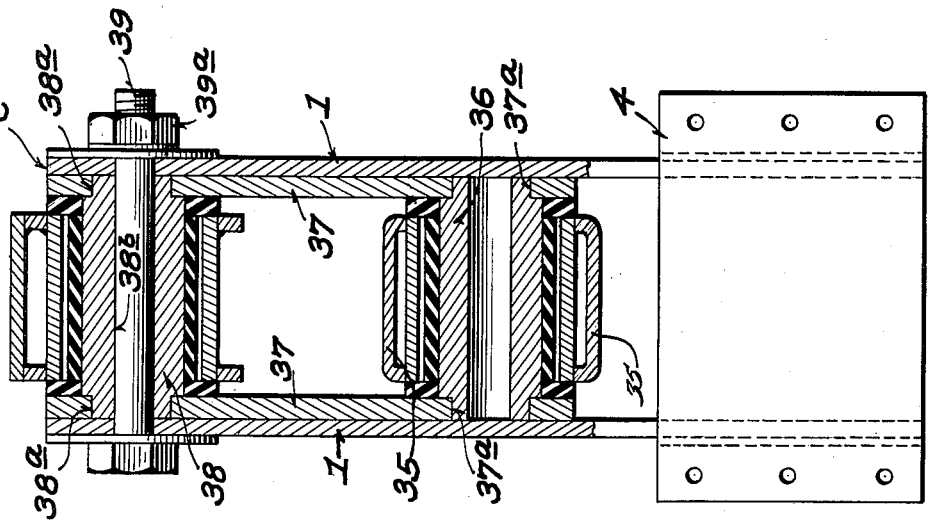
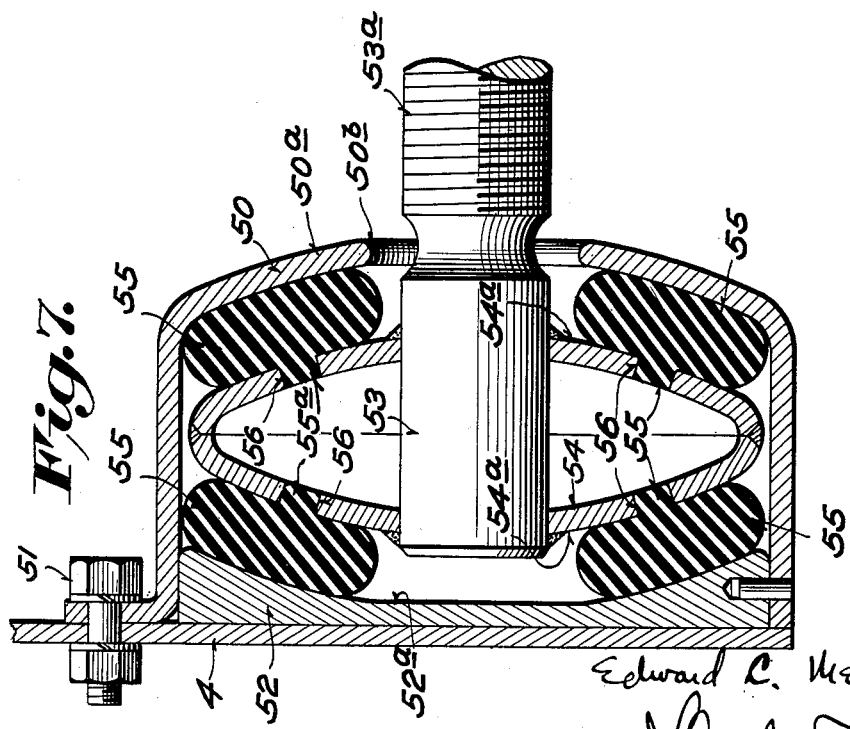
Inventor
Edward C. Merry
By
ATTORNEYS Patented June 3, 1952

2,599,469

UNITED STATES PATENT OFFICE 2,599,469

DIFFERENTIAL WHEEL UNIT FOR TRAILERS OR THE LIKE

Edward Chase Merry, Greensboro, N. C., assignor of one-half to Guy M. Turner, Greensboro, N. C.

Application November 22, 1948, Serial No. 61,345

20 Claims. (Cl. 280—104.5)

1

This invention in a novel differential wheel unit, particularly adapted to be mounted on drawn or trailing vehicles to support the rear ends thereof, whereby the vehicle may be operated at normal high speeds with safety, each unit comprising a short axle carrying a single pneumatic or other tire at each end, the axle being adapted to pivot transversely of the vehicle on an axis disposed below the axle, and the multiple units being connected together so as to cause one axle to raise or fall as the adjacent axle falls or rises, or vice versa.

Heretofore, somewhat similar units have been used to support the rear ends of such trailers but same have been designed primarily to maintain the platform height of the trailer as low as possible from the ground to facilitate loading and unloading of heavy machinery or other loads. The structures disclosed in the prior art would not be practical for fast freight carrying vehicles due to their use of dual or triple wheels at each end of the axles with tires having undue sectional width. My arrangement, however, is specially adapted for commercial high-speed vehicles for highway use, my unit having standard sized single wheels mounted on conventional short axles instead of the usual dual or triple wheel or special trucks heretofore used.

Contrary to the purpose of prior art structures in carrying the loads below the axles for the express purpose of suspending the platform height as low as possible, in my design the load is suspended below the axle primarily to keep the axle itself from tipping when severe side thrusts at high speeds are encountered. In using short axles with wheels of large diameter having a center to center distance of approximately twenty-eight inches, there would normally be a great tendency for the axles to trip laterally when the load carrying point is disposed on the axle or adjacent to same. In order to make this type of unit assembly perform satisfactorily without tipping, the load must be carried at a point sufficiently below the axle to overcome the tipping tendency due to severe lateral tire overloads. Research has developed the fact that if the angularity of this point is located at approximately 45° or less angle from the point of wheel contact with the road, the operation of the unit is quite satisfactory and the axle is still properly positioned with respect to road clearance.

The use of large diameter tires in combination with short axles, and the location of the carrying point within the above described angular range are therefore the important features of my

2 present invention; and the prior art structures do not specify that either such requirement is critical with respect to the use of short axles in high-speed highway service. Research has shown a critical relationship between the angularity of the point of road contact of the tire and the load carrying point, which angularity can range satisfactorily within the above mentioned range.

I will explain the invention with reference to the accompanying drawings, which illustrate one practical embodiment thereof, to enable others familiar with the art to adopt and use the same; and will summarize in the claims, the novel features of construction, and novel combinations of parts, for which protection is desired.

In said drawings:

Figure 1 is a side elevation, showing my novel differential wheel unit mounted to support one side of the rear end of a trailer.

Fig. 2 is a top plan view of the differential unit shown in Fig. 1, the trailer body being removed for the sake of clarity.

Fig. 3 is an enlarged vertical section on the line 3—3, Fig. 1.

Fig. 4 is an enlarged vertical section on the line 4—4, Fig. 1.

Fig. 5 is a side elevation of the towing yoke.

Fig 6 is a top plan view of the towing yoke.

Fig. 7 is an enlarged transverse section through the anchored end of the towing yoke shown in Figs. 5 and 6.

Fig. 8 is an enlarged section on the line 8—8, Fig. 1.

Fig. 9 is a detail section.

As shown, the trailer body A is provided with longitudinal side frame B of structural steel in the usual manner, same forming no part of my present invention. My tandem wheel construction is disposed at both sides of the frame, and since the constructions at both sides are identical, it is only necessary to describe the construction at one side.

Adjacent to and below the rear end of each frame B is an open depending bracket frame C, consisting of spaced parallel side plates I which are preferably fixedly secured to the under side of the side frame B and are connected together by bolts 2 or the like (Fig. 1) with spacers to maintain the spacing, said plates I having recesses 3 in their lower rear ends providing upwardly and forwardly inclined faces 3a upon which is fixedly secured a cross plate 4, the rear face of which also slopes upwardly and forwardly at an acute angle to the vertical, for the purpose hereinafter explained.

Adjacent the rear end of the side frame B, disposed intermediate bracket frame C and the rear end of the frame B, is a second bracket frame D consisting of spaced parallel side plates 5 (Figs. 1 and 2) fixedly secured to the under side of side frame B in alignment with the bracket frame C, side plates 5 being secured together in any desired manner, and having recesses 6 providing upwardly and forwardly inclined faces 6a upon which is fixedly mounted a plate 7 sloping upwardly and forwardly substantially parallel with the plate 4, for the purpose hereinafter described.

At the rear end of the side frame B is a third bracket frame E (Figs. 1, 2 and 3) of box-like construction disposed in alignment with the bracket frames C and D, the bracket frame E consisting of front and rear plates 8 and 8a connected by horizontal plates 9 and 10 in spaced parallel relation, forming a rectangular box-like frame opening at its front and rear ends for the purpose hereinafter set forth.

Between the bracket frames D—E is a short axle 11 (Fig. 4) at each side of the trailer, which axle carries at the ends thereof ground wheels 12—12, wheels 12 being disposed at each side of the respective side frame B. Directly beneath the respective side frame B is an inverted U-shaped strap 13, the lower end of which receives the outer shell wall of rubber torque bushing 14 horizontally disposed and connecting the lower free ends thereof, the upper end of U-shaped strap 13 being journaled on the rotatable axle 11. Straddling the U-shaped strap 13 is a U-shaped strap 15 having perforations at its lower end receiving the inner shell wall of the rubber torque bushing 14, said shell wall extending through the perforations in the legs of the straps 13 and 15 having a collar 16 mounted thereon to maintain the legs in spaced relation. The upper end of the inverted U-shaped strap 15 is welded in a rectangular recess 17a in an inverted channel shaped longitudinally disposed member 17, the respective ends of which enter between the plates 5 of the bracket frame D and into the opening between the horizontal plates 9 and 10 of the bracket frame E, as clearly shown in Fig. 1, whereby the member 17 is maintained in substantially axial alignment with the overlying frame member B of the trailer.

As shown in Figs. 2 and 9, at each side of the forward end of the member 17 are angle straps 18 which are oppositely faced and which carry resilient blocks 19, the outer ends of which are connected by a channel member 20, the base of which carries a wear plate 21 directly engaging a fixed wear plate 22 which is secured to the inner face of the related side plate 5 of bracket frame D, as shown, the opposed resilient blocks 19 yieldably centering the forward end of the longitudinal member 17 between the side plates 5 of bracket frame D.

The rear end of member 17 carries a box-like structure which is entered into the opening formed between the horizontal plates 9 and 10 of bearing frame E, said box-like structure consisting of front and rear plates 23 and 23a connected together by longitudinally extending frame members 24, through which extends a shackle bolt 25, which bolt 25 also transfixes the sides of the member 17 so as to move integrally therewith while permitting the member 17 to pivot vertically with respect to the structure 23—24. In the upper corners of the members 23 are journaled shafts 26 carrying rollers 27 which rotatably engage the under side of the upper horizontal plate 9 of the bearing frame E, as shown more particularly in Fig. 3, so that the rear end of member 17 may readily shift laterally with respect to the bearing frame E during towing of the trailer. A spacer 28 is provided around the bolt 25 between the plates 24.

Between the bracket frames C—D is a short axle 30, similar in all respects to axle 11 carrying wheels 12a at opposite sides thereof, and an inverted U-shaped strap 31 is journaled on the rotatable axle 30 in alignment with the strap 13, said strap 31 carrying at its lower end a rubber torque bushing 32, a spacer 33 being interposed between the legs of strap 31. Straddling the inverted U-shaped strap 31 is a U-shaped strap 34 similar in all respects to the strap 15, the base of which is welded or otherwise secured in a correspondingly shaped recess in a second longitudinal member 35, similar in design to the longitudinal member 17. Member 34 has opposed holes in its lower end receiving the inner shell wall of rubber torque bushing 32, whereby said axle 30 may tilt laterally with respect to the longitudinal member 35.

The forward end of the member 35, as shown in Figs. 1 and 8, carries a shackle bolt 36, the ends of which engage holes 37a respectively in a pair of opposed straps 37 (Fig. 8) which contact the inner faces of the side plates 1 of the bracket frame C, so as to prevent lateral shifting of the forward end of the longitudinal member 35 but permitting same to shift axially of the bracket frame C. The upper ends of the straps 37 are mounted upon the reduced ends 38a of a collar 38 fitting between the side plates 1 and having a bore 38b for the shackle bolt 39 passing through the collar and through the side plates 1 and carrying a nut 39a.

The rear end of the longitudinal member 35 also carries angle clips 18 (Fig. 9), resilient blocks 19, and channel plate 20 carrying the wear plate 21 which directly engages the fixed wear plate 22 at the forward edges of the bracket frame D, in the same manner previously described with respect to the longitudinal member 17.

By the above construction, the longitudinal member 35 may shift axially of the trailer frame within the bracket frame C—D by reason of the links 37 pivoting on the shackle bolt 39, but the forward end of the longitudinal members 35 is positively prevented from shifting laterally with respect to the bracket frame C. The rear end of the member 35 however is permitted a yieldable lateral shifting movement. The forward end of the longitudinal member 17 is similarly permitted a yieldable lateral shifting movement, while the rear end of the longitudinal member 17 is permitted an unrestrained lateral movement with respect to the bracket frame E; and also both members 35 and 17 permitted a longitudinal shifting movement with respect to the bracket frames C, D and E.

In the bearing frame D adjacent the lower end thereof is journaled a shaft 40, on which is mounted a sprocket wheel 41, and a chain 42 is connected as at 42a with the rear end of the longitudinal member 35 and is connected as at 42b with the forward end of the longitudinal member 17, so that as the rear end of the member 35 rises or falls, the forward end of the horizontal member 17 will correspondingly fall or rise, as the case may be.

In order to yieldably maintain the axles 30 and 11 in the normal positions shown in Fig. 1, while permitting a slight universal movement thereof, towing yokes are provided, same comprising a casting 50 mounted upon the inclined plate 4 of the bearing frame C as shown in Fig. 7, same being secured by bolts 51 or the like to plate 4, casting 50 having a rounded outer face 50a provided with a central opening 50b. At the inner end of the casting 50 is an opposed backing plate 52 having a concave outer face 52a substantially complementary to the rounded face 50a of casting 50, but spaced therefrom. Extending into the casting 50 is a rod 53 (Fig. 7) passing through the opening 50b and being threaded as at 53a at its end outside the casting 50. Said rod 53 carries within the casting 50 a head 54 welded thereon, of major diameter slightly less than the internal diameter of the casting 50, and having a curved outer face 54a and an oppositely curved inner face 54b corresponding in shape with the curvatures of the outer face 52a of the plate 52 and the outer wall 50a of casting 50. The outer portions of the head 54 carry resilient blocks 55 (Fig. 7) which are compressed between the adjacent faces of the head 54 and plate 52 at the rear end of the head, and between the head 54 and the rounded wall 50a of the casting 50, said resilient blocks 55 having integral lugs 55a which are received in recesses 56 in the head 54 to maintain the same in desired spaced relation. The use of the resilient blocks 55 arranged as above described permits the rod 53 to have a universal and longitudinal movement with respect to the bracket frames C and D, the towing yoke and mounting for shaft 11 being identical with those for shaft 30.

The outer threaded end 53a of rod 53 is threaded into the base 60 (Figs. 5 and 6) of a V-shaped yoke having legs 61 provided with arcuate recesses 61a at their outer ends, which receive and are welded or otherwise secured to their respective axles 30 or 11 at each side of the longitudinal members 35 and 17 respectively (Fig. 1), the above arrangement yieldably tending to maintain the axles 30 and 11 in their normal positions shown in Fig. 1, while permitting the axles 30 and 11 to move slightly in a fore and aft direction when the trailer is suddenly started or stopped, without injury to the unit; and also to shift slightly laterally to withstand strains. Preferably the rods 53 are maintained in adjusted positions in the yoke bases 60 by means of nuts 64 and 65 which permit proper adjustment of the parts.

The above construction provides a trailer tandem unit at each side of the rear end of a trailer which will be practical for fast freight carrying vehicles involving the use of axles having single wheels with ordinary tires mounted on their ends, said tires being of ordinary size for fast highway operation.

In my design, the load of the trailer is carried at points 32 and 14 disposed sufficiently below the axles 30 and 11, to keep said axles from tipping when severe vehicle side thrusts are encountered. In using short axles 30 and 11 with large diameter single wheels 12—12a there is a marked tipping tendency, and for moving fast freight the load must be carried at a point sufficiently below the axle to overcome the tipping tendency and severe tire overload. I have found that in order to maintain axle stability, the load carrying point 32—14 must be disposed far enough below the axle 30—11 so that a line X (Fig. 4) drawn from the center of the tire at the road contact through the carrying point 14 must be 45° or less, and my arrangement is designed accordingly. Thus, when the trailer is being drawn at high speeds, there is little or no tendency on the part of the axles 30 and 11 to tip, and a maximum axle stability is therefore maintained.

I do not limit my invention to the exact forms shown in the drawings, for obviously changes may be made therein within the scope of the claims.

I claim:

1. In a trailer having a body provided with side beams; spaced aligned open-ended bracket frames depending below the side beams; horizontal aligned members having their ends entered into adjacent pairs of bracket frames; relatively short axles carried by said members and mounted to pivot transversely thereof, the pivot points being intermediate the ends of and disposed below said axles; single wheels journaled on the respective ends of said axles; means connecting the front end of the forward member to the foremost bracket frame for permitting longitudinal movement therein while preventing lateral movement; means yieldably counteracting lateral movement of the rear end of the forward member and the forward end of the rear member in the intermediate bracket frame while permitting free vertical and longitudinal movement therein; means permitting free lateral and longitudinal movement of the rear end of the rear member in the rear bracket frame while preventing vertical movement; means connecting the adjacent ends of the said members in the intermediate bracket frame whereby as the end of one member rises the end of the other member will correspondingly fall, and vice versa; and towing yokes mounted for yieldable longitudinal and universal movement on the front and intermediate bracket frames and secured to the respective axles.

2. In a trailer as set forth in claim 1, said front bracket frame comprising spaced parallel plates, a pair of links journaled at their upper ends in the bracket frame and slidably engaging the inner faces of said plates, the lower ends of the links being pivotally connected to the front end of the forward member.

3. In a trailer as set forth in claim 1, the intermediate bracket frame comprising spaced parallel plates; vertically disposed wear plates on the inner faces of the plates adjacent the front and rear edges thereof; and resilient blocks mounted on the sides of the front and rear members; and other wear plates carried by said blocks engaging those on the said plates.

4. In a trailer as set forth in claim 3, said blocks each comprising a pair of outwardly converging resilient blocks having their inner ends secured by angle clips to the members, and their outer ends secured to the flanges of channel clips; the other wear plates being mounted on the outer faces of said channels.

5. In a trailer as set forth in claim 1, said rear bracket frame comprising a pair of spaced horizontal plates; a rectangular frame pivotally connected with the rear end of the rear member and fitting between said plates; and rollers carried by the rectangular frame mounted on axles disposed parallel with the said member, said rollers engaging the underside of the upper plate.

6. In a trailer as set forth in claim 1, said members having inverted U-shaped portions straddling the axles; other inverted U-shaped members journaled on the axles and embraced by the first named U-shaped members; and rubber torque bushings transfixing the lower overlapping ends of the U-shaped members and forming the said pivot points of the axles.

7. In a trailer as set forth in claim 6, the angularity of the pivot points with respect to the central points of contact of a related wheel with the road surface being no greater than 45° in order to minimize tipping tendency of the axles at high trailer speeds when the body is subjected to substantial lateral thrusts.

8. In a trailer as set forth in claim 1, each towing yoke being secured to the related bracket frame by a casing mounted on the bracket frame, said casing having its outer end rounded outwardly and provided with a central opening; a backing plate in the inner end of the casing having its outer face convexed complementary to the rounded end of the casing; a rod entering the opening in the casing and secured to the yoke; a head on the rod within the casing having its front and rear faces curved to conform with the rounded face of the casing and with the convexity of the backing plate, said head being spaced therefrom; and resilient blocks compressed between the adjacent faces of the head, the backing plate, and the rounded end of the casing.

9. In a trailer having a body provided with longitudinally disposed side beams; three spaced aligned open-ended bracket frames depending from the underside of the respective side beams; a pair of horizontal aligned members having their respective ends entered into the adjacent pairs of bracket frames; relatively short axles carried by each of said members and mounted to pivot transversely thereof; the pivot points being intermediate the ends of and disposed below said axles; single wheels of relatively large diameter journaled on the ends of said axles; means connecting the front end of the forward member to the foremost bracket frame for permitting longitudinal movement therein while preventing lateral movement; means yieldably counteracting lateral movement of the rear end of the forward member and the forward end of the rear member in the central bracket frame while permitting free vertical and longitudinal movement therein; means permitting free lateral and longitudinal movement of the rear end of the rear member in the rear bracket frame while preventing vertical movement; a sprocket wheel journaled in the central bracket frame; a chain running under the sprocket and having its ends respectively connected with the adjacent ends of the said members, whereby as the end of one member rises the adjacent end of the other member will correspondingly fall, and vice versa; and towing yokes mounted for yieldable longitudinal and universal movement on the front and central bracket frames and secured to the respective axles.

10. In a trailer as set forth in claim 9 said front bracket frame comprising spaced parallel plates, a pair of links journaled at their upper ends in the bracket frame and slidably engaging the inner faces of said plates, the lower ends of the links being pivotally connected to the front end of the forward member.

11. In a trailer as set forth in claim 9, the central bracket frame comprising spaced parallel plates; vertically disposed wear plates on the inner faces of the plates adjacent the front and rear edges thereof; and resilient blocks mounted on the sides of the front and rear members; and other wear plates carried by said blocks engaging those of the said plates.

12. In a trailer as set forth in claim 11, said blocks each comprising a pair of outwardly converging resilient blocks having their inner ends secured by angle clips to the members, and their outer ends secured to the flanges of channel clips; the other wear plates being mounted on the outer faces of said channels.

13. In a trailer as set forth in claim 9, said rear bracket frame comprising a pair of spaced horizontal plates; a rectangular frame pivotally connected with the rear end of the rear member and fitting between said plates; and rollers carried by the rectangular frame mounted on axles disposed parallel with the said member, said rollers engaging the underside of the upper plate.

14. In a trailer as set forth in claim 9, said members having inverted U-shaped portions straddling the axles; other inverted U-shaped members journaled on the axles and embraced by the first named U-shaped members; and rubber torque bushings transfixing the lower overlapping ends of the U-shaped members and forming the said pivot points of the axles.

15. In a trailer as set forth in claim 14, the angularity of the pivot point with respect to the central point of contact of a related wheel with the road surface being no greater than 45° in order to minimize tipping tendency of the axles at high trailer speeds when the body is subjected to substantial lateral thrusts.

16. In a trailer as set forth in claim 9, each towing yoke being secured to the related bracket frame by a casing mounted on the bracket frame, said casing having its outer end rounded outwardly and provided with a central opening; a backing plate in the inner end of the casing having its outer face convexed complementary to the rounded end of the casing; a rod entering the opening in the casing and axially adjustably secured to the yoke; a head on the rod within the casing having its front and rear faces curved to conform with the rounded face of the casing and with the convexity of the backing plate, said head being spaced therefrom; and resilient blocks carried by the head and compressed between the adjacent faces of the head, the backing plate, and the rounded end of the casing.

17. In a trailer having a body provided with three spaced aligned open-ended bracket frames depending from the underside thereof; a pair of horizontal aligned members having their respective ends entered into the adjacent pairs of bracket frames; relatively short axles carried by each of the said members and mounted for pivotal movement transversely of said members, said pivot points being intermediate the ends of and disposed below said axles; single wheels of relatively large diameter journaled on the respective ends of said axles; means connecting the front end of the forward member to the foremost bracket frame for permitting longitudinal movement therein while preventing lateral movement; means yieldably counteracting lateral movement of the rear end of the forward member and the forward end of the rear member in the central bracket frame while permitting free vertical and longitudinal movement therein; means permitting free lateral and longitudinal movement of the rear end of the rear member in the rear bracket frame while preventing vertical movement; means connecting the adjacent ends of the said members in the central bracket, whereby as the end of one member rises the end of the other member will correspondingly fall, and vice versa; and the towing means mounted for yieldable longitudinal and universal movement on the front and central bracket frames and secured to the respective axles.

18. In a trailer as set forth in claim 17, said members having inverted U-shaped portions straddling the axles; other inverted U-shaped members journaled on the axles and embraced by the first named U-shaped members; and rubber torque bushings transfixing the lower overlapping ends of the U-shaped members and forming the said pivot points of the axles.

19. In a trailer as set forth in claim 18, the angularity of the pivotal point with respect to the central point of contact of a related wheel with the road surface being no greater than 45° in order to minimize tipping tendency of the axles at high trailer speeds when the body is subjected to substantial lateral thrusts.

20. In a trailer as set forth in claim 17, each towing means being secured to the related bracket frame by a casing mounted on the bracket frame, said casing having its outer end rounded outwardly and provided with a central opening; a backing plate in the inner end of the casing having its outer face convexed complementary to the rounded end of the casing; a rod entering the opening in the casing and axially adjustably secured to the yoke; a head on the rod within the casing having its front and rear faces curved to conform with the rounded face of the casing and with the convexity of the backing plate, said head being spaced therefrom; and resilient blocks carried by the head and compressed between the adjacent faces of the head, the backing plate, and the rounded end of the casing.

EDWARD CHASE MERRY.

REFERENCES CITED

The following references are of record in the file of this patent:

UNITED STATES PATENTS

| Number | Name | Date |
|---|---|---|
| 1,905,242 | Rogers et al. | Apr. 25, 1933 |
| 2,091,090 | Bigley, Jr. | Aug. 24, 1937 |
| 2,269,728 | Mills | Jan. 13, 1942 |
| 2,272,572 | Merry | Feb. 10, 1942 |
| 2,296,681 | Merry | Sept. 22, 1942 |